United States Patent [19]

Liang

[11] Patent Number: 4,778,017
[45] Date of Patent: Oct. 18, 1988

[54] WEIGHING SCALE HAVING A SHOCK-ABSORBING PLATFORM SUPPORT

[75] Inventor: Charles Liang, Des Plaines, Ill.

[73] Assignee: Pelouze Scale Company, Evanston, Ill.

[21] Appl. No.: 142,667

[22] Filed: Jan. 11, 1988

[51] Int. Cl.$^4$ ............................................. G01G 21/10
[52] U.S. Cl. ..................................................... 177/187
[58] Field of Search .................................. 177/184–189

[56] References Cited

U.S. PATENT DOCUMENTS

| | | | |
|---|---|---|---|
| 4,058,179 | 11/1977 | Price | 177/187 X |
| 4,278,139 | 7/1981 | Caris | 177/189 X |
| 4,570,729 | 2/1986 | Del Rosso | 177/189 X |
| 4,724,914 | 2/1988 | Liang | 177/187 |
| 4,726,435 | 2/1988 | Kitagawa et al. | 177/187 |

Primary Examiner—George H. Miller, Jr.
Attorney, Agent, or Firm—Augustus G. Douvas

[57] ABSTRACT

A weighing scale having a shock-absorbing platform support. The scale comprises a scale platform seated on a platform saddle, a scale base, a load-cell transducer having first and second body portions separated from one another, and a platform shock-mount. The platform shock-mount includes a Y-shaped transducer-support frame formed with three arms each having an extremity extended from a central frame junction with the scale platform saddle being fixed to the first transducer body portion and the second transducer body portion being fixed to the central frame junction, a preloaded spring assembly carried on the base and having a spring resiliently supporting each arm extremity of the Y-frame on the base, and a set of adjustable platform motion-limit stop screws. The preload force of the spring assembly and the platform motion permitted before the engagement of the limit stop screws are both adjusted in accordance with a specified platform-weight-shift test, so that as a shock force grows to exceed the readout weight limit of the scale the force is momentarily absorbed by the spring assembly before the platform is braked by the stop screws.

12 Claims, 4 Drawing Sheets

WEIGHING SCALE HAVING A SHOCK-ABSORBING PLATFORM SUPPORT

BACKGROUND OF THE INVENTION

This invention relates to a shock-absorbing platform support for a weighing scale employing load-cell transducers.

Load-cell transducers are used extensively in scales because of their accuracy in measuring weights. These transducers are generally characterized by a metallic body having a rectangular perimeter. An opposing pair of perimeter surfaces carry surface-mounted, resistor strain gauges. The central portion of the body is machined to form a rigidly-specified opening beneath the strain gauges to define a desired bending curve in the body. When the gauges are interconnected to form an electrical bridge or other network, and the transducer body is used as a cantilevered support for a weighing platform, temporary deformations in the transducer body are translated into electrical signals accurately responsive to weights placed on the platform.

Weighing accuracy is maintained so long as the transducer body is not permanently deformed. Unfortunately, many users of platform scales subject the platform to shock forces by buffeting and banging the platform. While the transducer is usually spring-mounted so as to absorb the resulting shock and thus avoid permanent damage to the transducer body, many of these prior-art spring supports are not cost effective and are difficult to install and maintain in adjustment.

A principal object of this invention is to provide a shock-absorbing platform support for a weighing scale employing a load-cell transducer that is cost effective, reliable, and easy to adjust and maintain.

SUMMARY OF THE INVENTION

Accordingly a principal structural feature of this invention relates to a shock-absorbing platform support for a weight scale. The scale comprises a scale platform seated on a platform saddle, a scale base, a load-cell transducer having first and second body portions separated from one another, and a platform shock mount. The platform shock mount includes (1) a Y-shaped transducer-support frame formed with three arms each having an extremity extended from a central frame junction with the scale platform saddle being fixed to the first transducer body portion and the second transducer body portion being fixed to the central frame junction, (2) a preloaded spring assembly carried on the base and having a spring resiliently supporting each arm extremity of the Y-frame on the base, and (3) a set of adjustable platform motion-limit stop screws.

The preload force of the spring assembly, and the platform motion permitted before the braking engagement of the limit stop screws, are both adjusted in accordance with a specified platform-weight-shift test. In particular, as a shock force grows to exceed the readout weight limit of the scale the force is momentarily absorbed by the spring assembly before the platform is braked by the stop screws.

DESCRIPTION OF THE DRAWINGS

In order that all of the structural features for attaining the objects of this invention may be readily understood, detailed reference is made to the drawings in which:

FIG. 9 is a diagram of assistance in understanding the weight-platform-shift test used to adjust a scale of this invention for proper shock-absorbing operation.

DETAILED DESCRIPTION OF THE PREFERRED EMBODIMENT

Figure 1:
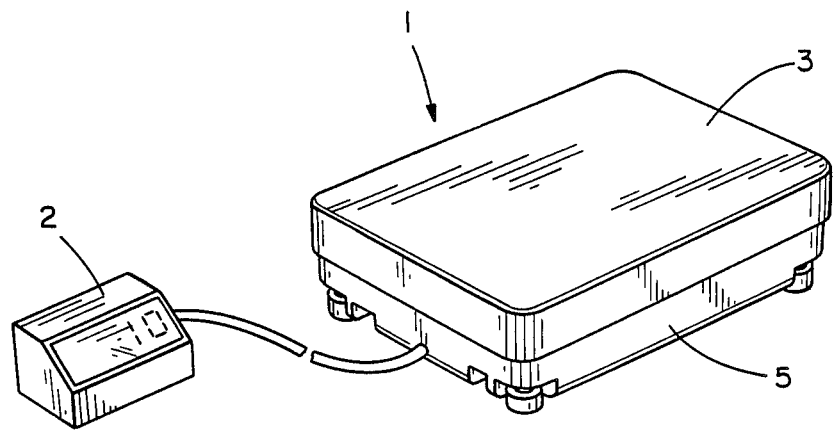
FIG. 1 is a perspective view of the exterior of a typical platform weighing scale to which the shock-absorbing platform support of this invention may be applied.

Referring to the drawings, a brief summary of the structure and mode of operation of this invention is as follows:

The shock-absorbing platform support (FIGS. 2-8) of this invention is shown applied to weighing scale 1 (FIG. 1). Scale 1 provides weight readings at digital readout display 2 for objects placed on platform 3. Platform 3 is seated on platform saddle 4. Platform saddle 4 is shock supported on base 5 by attachment to load-cell transducer 6 which is in turn carried on shock-mount 7. Shock-mount 7 includes: (1) a Y-shaped transducer-support frame 8 formed with three arms 9, 10 and 11 each joined together at central frame junction 12; (2) a preloaded spring assembly 13 carried on base 5 and having three helical springs 14, 15 and 16, each supporting a different associated arm 9, 10 or 11 on base 5; and (3) a set of adjustable platform motion-limit stop screws 17, 18, 19 and 20.

Springs 14, 15 and 16 are force preloaded by adjusting bolts 21, 22 and 23 so that the springs are normally partially compressed with no weight on platform 3; and motion-limit stop screws 17, 18, 19 and 20 are also adjusted so that platform 3 moves downwardly only a predetermined distance before platform saddle 4 is braked by the motion-limit stop screws.

The preload force of spring assembly 13, and the platform saddle motion permitted by one or more limit stop screws 17, 18, 19 and 20, are both adjusted in accordance with a specified platform-weight-shift test (see FIG. 9 description), such as for example that appearing in Handbook 44 of the National Bureau of Standards described in the following text. With proper preload spring and motion-limit adjustments, as a vertical shock force applied to platform 3 grows to exceed the readout weight limit of scale 1, the force is momentarily absorbed by spring assembly 13 before platform saddle 4 is braked by one or more stop screws 17, 18, 19 and 20. The brief period of shock absorption immediately before braking occurs greatly reduces the possibility of damage to scale 1, particularly load-cell transducer 6.

A detailed description of structure, adjustment in accordance with the platform-weight-shift test, and the mode of operation of this invention is as follows:

A set of four rubber discs 24, 25, 26 and 27 are affixed to the interior corners of platform 3. These discs rest on the adjacent corner surfaces of metallic platform saddle 4 so that platform 3 has a cushioned support on the saddle. Platform 3 may be manually removed easily from its seated position on carriage 4 because of the absence of any fasteners. The downward flange or skirt formed on the periphery of platform 3 serves in maintaining the proper relative positioning of platform 3 and platform saddle 4.

Figure 2:
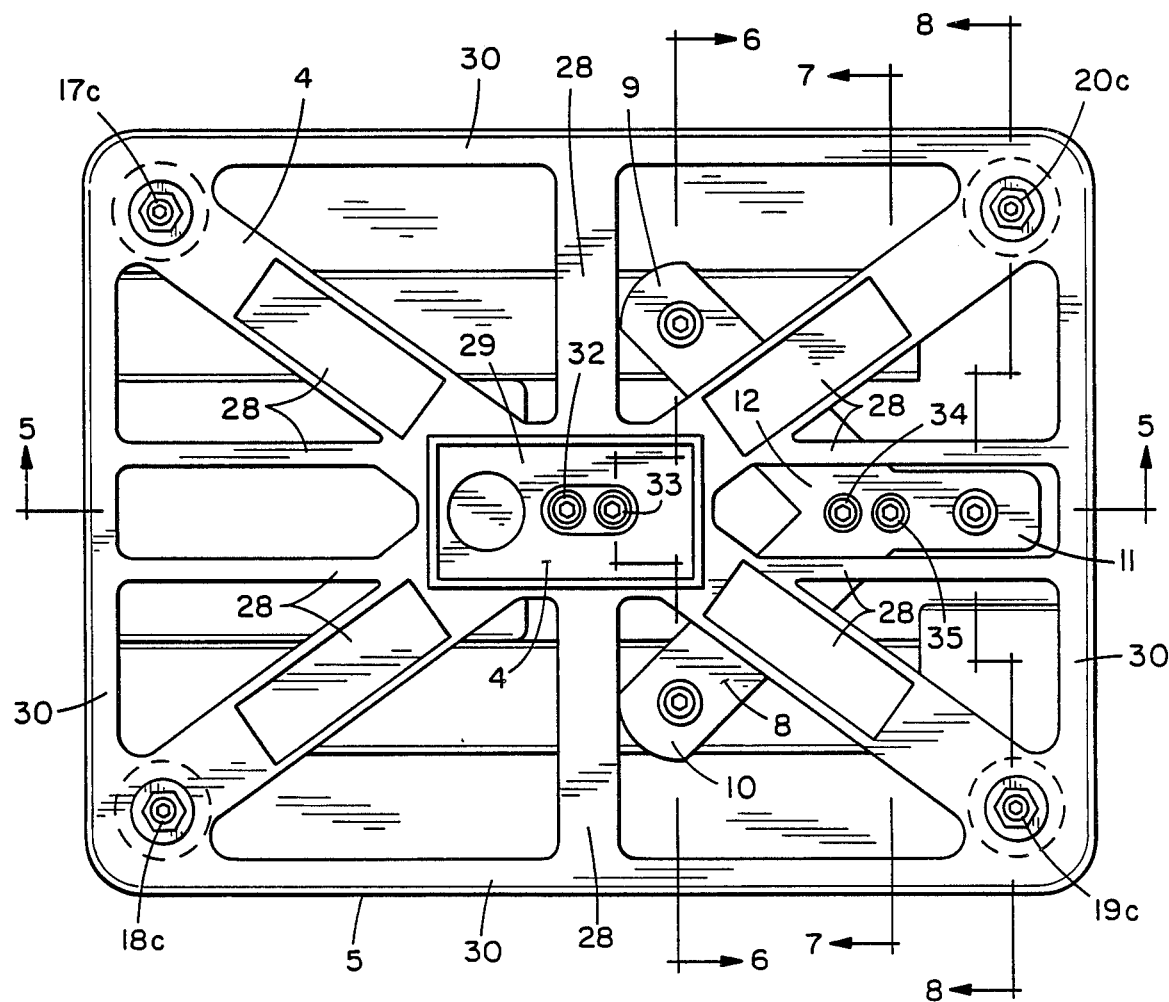
FIG. 2 is a plan view of the scale of FIG. 1, with the platform removed to show a preferred embodiment of the invention in which a load-cell transducer is fixed to a Y-frame having three extended arms resiliently mounted on the scale base by a preloaded spring assembly.
Figure 3:
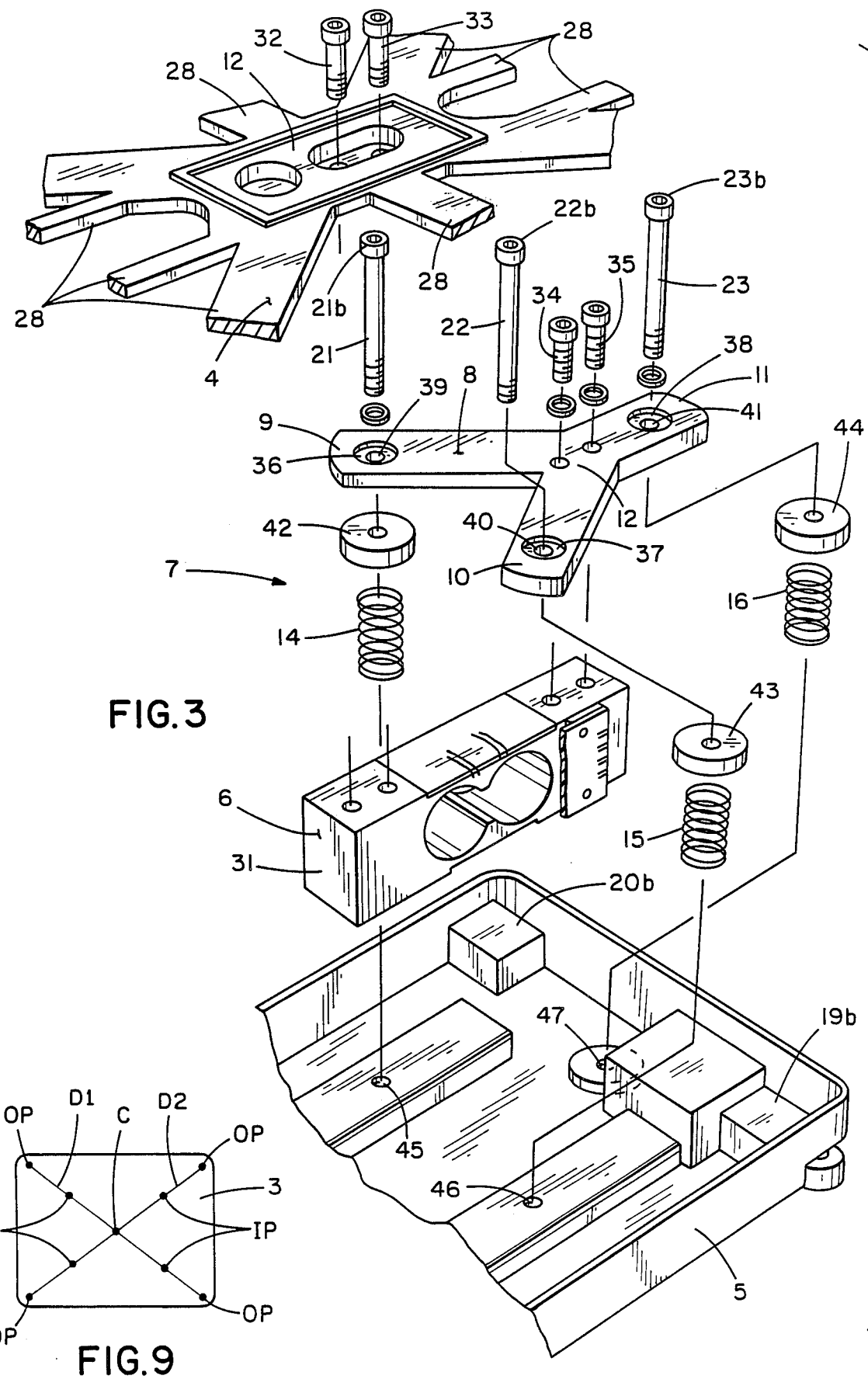
FIG. 3 is an exploded view which shows the manner of assembly of the principal shock-mount components of this invention, namely, the Y-frame and its preloaded spring assembly, the load-cell transducer, and the platform saddle.
Figure 4:
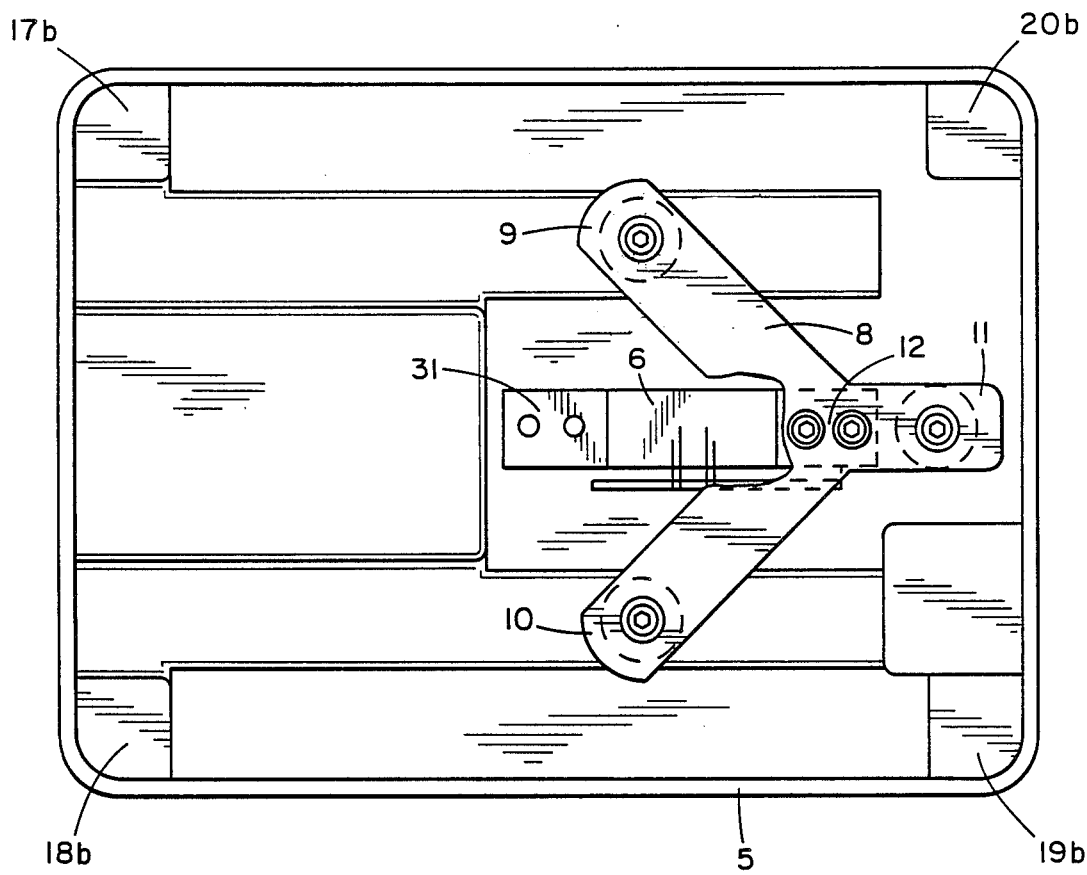
FIG. 4 is a bottom view of the principal components of FIG. 3 in assembled form.
Figure 5:
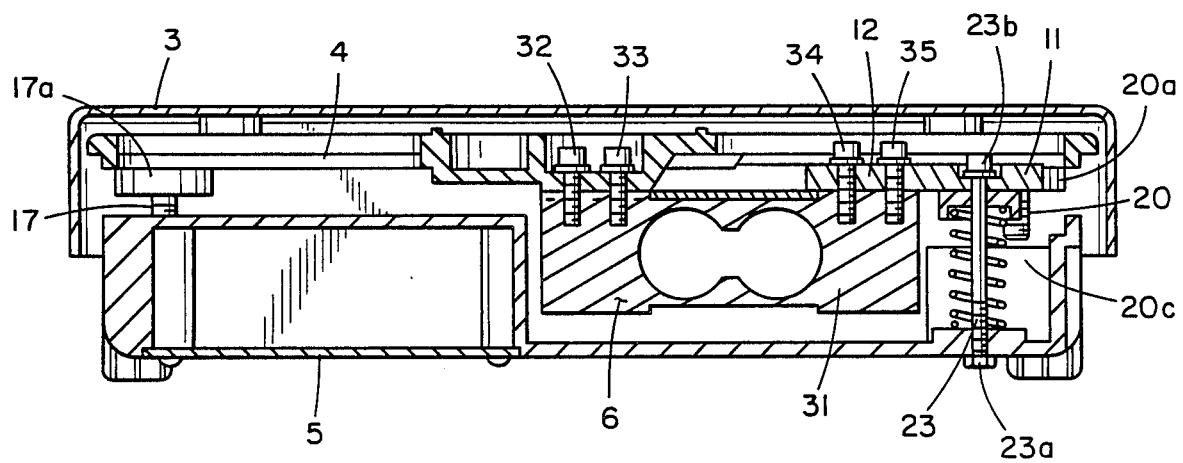
FIG. 5 is a section view taken along line 5—5 of FIG. 2 which shows the assembly of the principal components of FIGS. 2 through 4.
Figure 6:
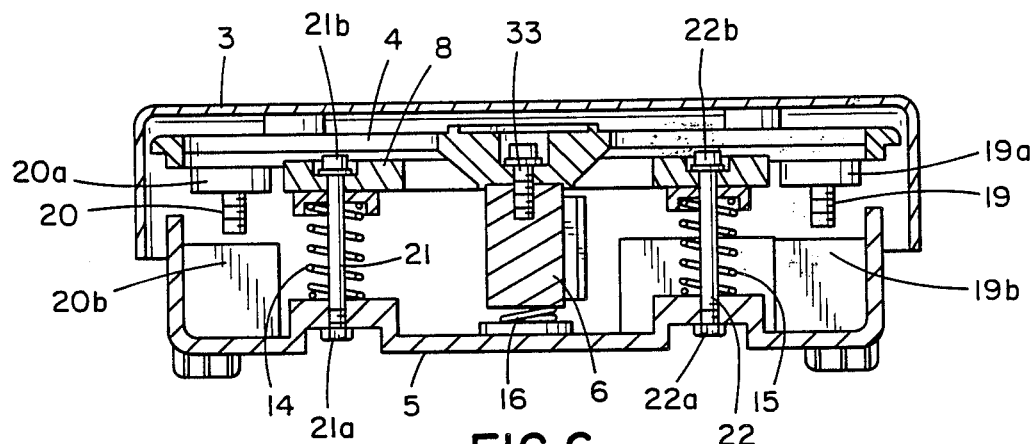
FIG. 6 is a section view taken along line 6—6 of FIG. 1 which shows details of the spring assembly for the two central arms of the Y-frame to the scale base.
Figure 7:
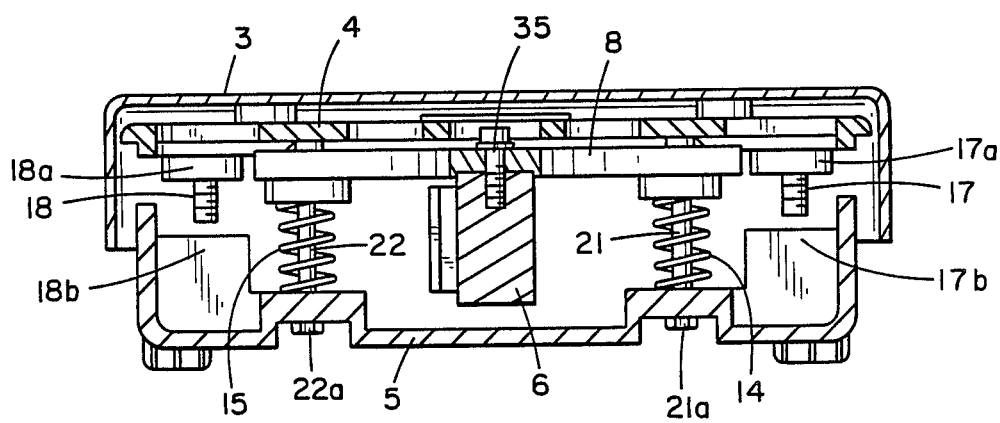
FIG. 7 is a section view taken along line 7—7 of FIG. 1 which shows details of the fixed attachment of the load-cell transducer to a central portion of the Y-frame.
Figure 8:
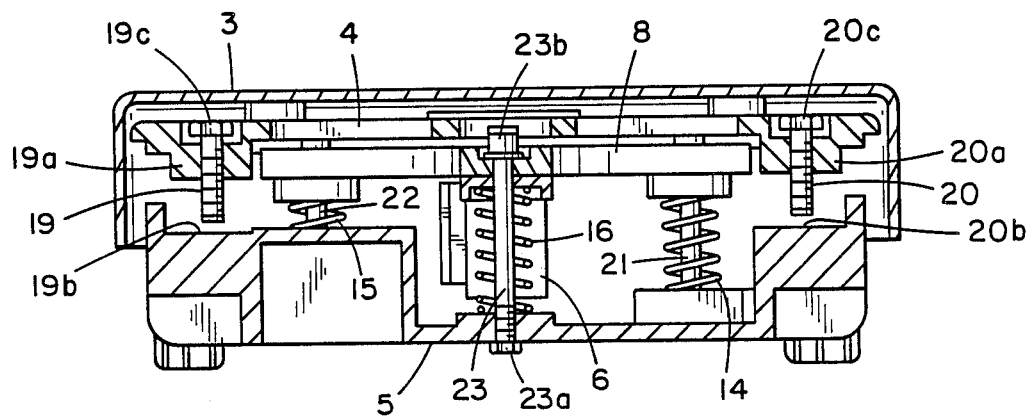
FIG. 8 is a section view taken along line 8—8 of FIG. 2 which shows details of the spring support of the rear arm of the Y-frame to the scale base.

As is best shown in FIG. 2, saddle 4 is a metallic grid of open framework having a plurality of radial elements 28 emanating from a central saddle portion 29 and joined at their extremities by an outer generally rectangular ring 30.

Tapped bosses 17a, 18a, 19a and 20a are integrally formed on the lower corner surfaces of saddle 4. Motion-limit stop screws 17, 18, 19 and 20 engage the threaded bores of the bosses so that the threaded shanks of the screws project downwardly to face stop shoulders 17b, 18b, 19b and 20b, respectively (FIGS. 3, 4, 6, 7 and 8). Each of the motion-limit stop screws is formed with an adjusting hex head 17c, 18c, 19c or 20c, which is accessed for adjustment by a hex wrench (not shown) through an overlying access hole formed in the associated saddle corner.

When each stop screw is properly spaced relative its adjacent shoulder, one or more stop screws are bottomed on the shoulders only after an applied shock force to platform 3 exceeds the weight limit of the scale and one or more of helical springs 14, 15, 16 and 17 are partially comprssed relative their no-load spring compression settings.

Platform saddle 4 is fixed to the left end of metallic body 31 of load-cell transducer 6 by a pair of bolts 32 and 33. Transducer 6 serves as the sole support for platform saddle 4 and its seated platform 3. In the event platform 3 is subjected to an excessive shock force, metallic body 31 may be permanently distorted, thus causing the typical bridge network of resistor strain gauges (not shown) applied to the upper and lower peripheral surfaces of transducer 6 to readout constantly erroneous weight readings at digital display 2.

The stresses tending to deform body 31 permanently can be relatively large because any shock force to which platform 3 is subjected is applied to a cantilevered and freely moving end of body 31 located approximately the entire length of body 31 from an opposite base supported end.

The right end of transducer body 31 is fixed to central frame junction 12 of Y-shaped transducer support frame 8 by a pair of bolts 34 and 35. A circular recess 36, 37, or 38 (FIG. 3) is formed in each of frame arms 9, 10 and 11.

A preload-force adjusting bolt 21, 22, or 23 passes through hole 39, 40, or 41 centrally located within recess 36, 37, or 38, washer 42, 43, or 44, and spring 14, 15, or 16, tapped holes 45, 46, or 47 formed in base 5, and are held in place by engaging nuts 21a, 22a or 23a, located on the bottom side of base 5. Manual rotation of hex heads 21b, 22b and 23b of bolts 21, 22 and 23 by a hex wrench (not shown) adjusts the preload compression of springs 14, 15 and 16. The total preload force developed by springs 14, 15 and 16 is applied to transducer support frame 8 and in turn to all of the scale components supported by the frame, namely, transducer 6, platform saddle 4, and platform 3.

As previously noted, the preload force applied to the platform must be appropriately adjusted by manual rotation of bolts 21, 22 and 23 before the scale is used; and similarly, the saddle 4 motion permitted before stop screws 17, 18, 19 and 20 engage their respective stop shoulders 17b, 18b, 19b and 20b, must also be appropriately adjusted. These adjustments are preferably conducted in accordance with platform-weight-shift test described in Handbook 44 of the National Bureau of Standards. This test is briefly described in conjunction with the diagram of assistance of FIG. 9.

In FIG. 9, the plan view surface area of scale platform 3 is shown subdivided by two intersecting diagonal lines D1 and D2. The point of intersection C of the diagonal lines D1 and D2 is therefore located at the geometrical center of the platform surface area. A set of four outer points OP are located at the outer extremities of diagonal lines D1 and D2. Additionally, a set of four intermediate points IP are located on each of the diagonals so as to bisect each diagonal line length from C to OP.

After the nine points C, IP and OP are located and assuming the upper scale readout weight limit is ten pounds, the following test steps are conducted in sequence:

Step (1) A 10-pound test weight is centered on point C and preload adjusting bolts 21, 22 and 23 and stop screws 17, 18, 19 and 20 are manually adjusted so that the weight readout is 10 pounds with springs 14, 15 and 16 under some compression and stop screws 17, 18, 19 and 20 out of contact with their associated stop shoulders 17b, 18b, 19b and 20b.

Step (2) A 5-pound test weight is centered on each of the four intermediate points IP in sequence, and preload adjusting bolts 21, 22 and 23 are manually adjusted so that weight readout is 5 pounds with springs 14, 15 and 16 under some compression; and stop screws 17, 18, 19 and 20 are thereafter adjusted at each IP position of the 5-pound test weight, so that the stop screws are out of contact with their associated stop shoulders.

Step (3) A 2.75-pound tet weight is centered on each of the four outer points OP in sequence, and preload adjusting bolts 21, 22 and 23 are manually adjusted so that the weight readout is 2.75 pounds with springs 14, 15 and 16 under some compression. Stop screws 17, 18, 19 and 20 are thereafter adjusted at each OP position of the test weight so as to be out of contact with their associated stop shoulders.

With the completion of the above adjustments, scale 1 is ready for use, and the shock-absorbing function will not occur until after the 10-pound upper-weight limit of the scale has been exceeded.

It should be understood that the above described structure is merely illustrative of one application of the principles of this invention. Modifications can be made without departing from the scope of the invention.

What is claimed is:

1. A shock-absorbing platform support for a weighing scale comprising a platform saddle, a scale platform seated upon the saddle, a load-cell transducer having first and second body portions separated from one another, a Y-shaped support frame for the transducer having three arms each with an extremity extended from a central junction portion of the frame with the platform saddle being fixed to the first transducer body portion and the second transducer body portion being fixed to the central junction portion of the frame, a scale base, a preloaded spring assembly carried on the base and having an individual preloaded spring resiliently supporting each arm extremity on the base, and a set of stop screws limiting the motion of the platform saddle in response to a platform applied shock force.

2. The combination of claim 1 in which the force of the total spring preload exceeds the upper weight limit of the scale.

3. The combination of claim 2 in which a preloaded spring is sandwiched between the base and an individual and different arm extremity of the Y-frame.

4. The combination of claim 3 in which each spring is a helical spring.

5. The combination of claim 4 in which a preload adjusting shaft mounted on the base passes through the bore of an associated spring and arm extremity of the Y-frame.

6. The combination of claim 5 in which the adjusting shaft is a bolt.

7. A shock-absorbing platform support for a weighing scale comprising a platform saddle, a scale platform seated upon the saddle, a load-cell transducer having first and second body portions separated from one another, mounting means for the transducer having an outlying portion extending from a central portion with the scale platform saddle being fixed to the first transducer body portion and the second transducer body portion being fixed to the central portion of the mounting means, a scale base, and a preloaded spring assembly carried on the base and having a plurality of preloaded springs resiliently supporting the outlying support portion of the mounting means on the base with the springs being located away from the central portion, and stop means limiting the motion of the platform saddle in response to a platform applied shock force.

8. The combination of claim 7 in which the force of the total spring preload exceeds the upper weight limit of the scale.

9. The combination of claim 8 in which a plurality of preloaded springs are sandwiched between the base and the outlying portion of the mounting means.

10. The combination of claim 9 in which each spring is a helical spring.

11. The combination of claim 10 in which a preload adjusting shaft mounted on the base passes through the bore of an associated spring and the outlying support portion.

12. The combination of claim 11 in which the adjusting shaft is a bolt.

* * * * *